US 6,592,928 B2

(12) United States Patent
Makela et al.

(10) Patent No.: US 6,592,928 B2
(45) Date of Patent: Jul. 15, 2003

(54) FESTOONED LAMINATED CANDY AND METHODS FOR MAKING SAME

(75) Inventors: Brian Makela, Dublin, OH (US); Ronald Paul Duffell MacDonald, Marysville, OH (US); Christine Zerby, Marengo, OH (US)

(73) Assignee: Nestec S.A., Vevey (CH)

( * ) Notice: Subject to any disclaimer, the term of this patent is extended or adjusted under 35 U.S.C. 154(b) by 40 days.

(21) Appl. No.: 09/989,011

(22) Filed: Nov. 21, 2001

(65) Prior Publication Data

US 2002/0058102 A1 May 16, 2002

Related U.S. Application Data

(63) Continuation-in-part of application No. 09/939,892, filed on Aug. 27, 2001, and a continuation-in-part of application No. 09/712,265, filed on Nov. 15, 2000.

(51) Int. Cl.⁷ .............................. A23G 3/00; A23P 1/08
(52) U.S. Cl. ...................... 426/660; 426/571; 426/572; 426/659; 426/519; 426/517
(58) Field of Search ................. 426/660, 571, 426/572, 659, 517, 516

(56) References Cited

U.S. PATENT DOCUMENTS

| | | | |
|---|---|---|---|
| 1,566,329 A | 12/1925 | Laskey | |
| 1,951,694 A | 3/1934 | Goulstone | 226/100 |
| 2,478,075 A | 8/1949 | Baker | 107/1 |
| 2,742,000 A | 4/1956 | Hansen et al. | 107/27 |
| 3,213,808 A | 10/1965 | Schafer | 107/1 |
| 3,554,137 A | 1/1971 | Carre et al. | 107/4 |
| 3,702,254 A | 11/1972 | Cassanelli et al. | 99/139 |
| 3,821,452 A | 6/1974 | Hayashi | 426/502 |
| 3,851,084 A | 11/1974 | Rossen et al. | 426/343 |
| 3,940,226 A | 2/1976 | Verhoeven | 425/375 |
| 3,968,267 A | 7/1976 | Ogasa et al. | 426/570 |
| 4,027,047 A | 5/1977 | Harima | 426/383 |
| 4,054,271 A | 10/1977 | Lanzillo | 366/70 |
| 4,113,819 A | 9/1978 | Hayashi et al. | 264/173 |
| 4,279,932 A | 7/1981 | Koshida et al. | 426/89 |
| 4,289,790 A | 9/1981 | Bruelle | 426/93 |
| 4,305,965 A | 12/1981 | Cheney | 426/104 |
| 4,357,359 A | 11/1982 | Cloud et al. | 426/103 |
| 4,391,832 A | 7/1983 | Haas, Sr. et al. | 426/275 |
| 4,449,906 A | 5/1984 | Sienkiewicz et al. | 425/131.1 |
| 4,536,147 A | 8/1985 | Groff | 425/323 |
| 4,542,028 A | 9/1985 | Butcher et al. | 426/100 |
| 4,563,358 A | 1/1986 | Mercer et al. | 426/89 |
| 4,563,363 A | 1/1986 | Yoon | 426/303 |
| 4,647,467 A | 3/1987 | Pinto | 426/502 |
| 4,648,316 A | 3/1987 | Ruffinatti | 99/483 |
| 4,648,821 A | 3/1987 | Thulin | 425/133.1 |
| 4,651,635 A | 3/1987 | Ally | 99/450 |
| 4,679,496 A | 7/1987 | Simelunas et al. | 99/450 |
| 4,715,803 A | 12/1987 | Koppa | 425/133.1 |
| 4,732,770 A | 3/1988 | Welygan et al. | 426/94 |
| 4,778,685 A | 10/1988 | Simelunas et al. | 426/297 |
| 4,781,929 A | 11/1988 | Hoashi | 426/92 |
| 4,793,786 A | 12/1988 | Greenhouse et al. | 425/131.1 |
| 4,821,634 A | 4/1989 | Swanson | 99/450.2 |
| 4,822,627 A | 4/1989 | Clegg et al. | 426/101 |
| 4,828,854 A | 5/1989 | Beer | 426/104 |
| 4,847,090 A | 7/1989 | Della Posta et al. | 424/440 |
| 4,851,247 A | 7/1989 | Greenhouse et al. | 426/250 |
| 4,858,524 A | 8/1989 | Simelunas et al. | 99/450.2 |
| 4,878,425 A | 11/1989 | Butcher et al. | 99/450.2 |
| 4,888,187 A | 12/1989 | Given, Jr. et al. | 426/102 |
| 4,894,002 A | 1/1990 | Groff | 425/319 |
| 4,911,937 A | 3/1990 | Crosello et al. | 426/103 |
| 4,913,645 A | 4/1990 | Daouse et al. | 425/150 |
| 4,923,706 A | 5/1990 | Binley et al. | 426/516 |
| 4,932,317 A | 6/1990 | Hoormann | 99/450.2 |
| 4,949,630 A | 8/1990 | Knebl | 99/450 |
| 5,000,969 A | 3/1991 | Beer | 426/101 |
| 5,035,905 A | 7/1991 | Knebl | 426/284 |
| 5,073,389 A | 12/1991 | Wienecke | 426/103 |
| 5,087,464 A | 2/1992 | Eberhardt et al. | 426/231 |
| 5,126,157 A | 6/1992 | Burwell et al. | 426/515 |
| 5,194,283 A | 3/1993 | Dupas et al. | 426/582 |
| 5,437,879 A | 8/1995 | Kabse et al. | 426/5 |
| 5,500,234 A | 3/1996 | Russo | 426/103 |
| 5,603,965 A | 2/1997 | Daouse | 425/130 |
| 5,686,128 A | 11/1997 | Tracy et al. | 426/284 |
| 5,723,164 A | 3/1998 | Morano | 426/572 |
| 5,731,020 A | 3/1998 | Russo | 426/104 |
| 5,792,500 A | 8/1998 | Housset et al. | 426/582 |
| 5,843,350 A | 12/1998 | Maeda et al. | 264/40.5 |
| 6,054,166 A | 4/2000 | Dupart | 426/549 |
| 6,183,799 B1 | 2/2001 | Wu et al. | 426/516 |
| 6,514,555 B1 | 2/2003 | Fayard et al. | 426/565 |

FOREIGN PATENT DOCUMENTS

| | | |
|---|---|---|
| CA | 2187940 | 4/1997 |
| CN | 87104646 | 1/1988 |
| DE | 2426569 | 12/1975 |
| DE | 2314826 | 4/1978 |
| DE | 3423727 | 1/1986 |
| DE | 3436578 | 1/1986 |
| DE | 4229897 | 3/1994 |
| DE | 29815302 | 12/1998 |
| EP | 530313 A1 | 11/1993 |
| EP | 0 619 949 A1 | 10/1994 |
| EP | 0 653 285 A1 | 5/1995 |
| EP | 0 848 910 A2 | 6/1998 |
| EP | 0 848 910 A3 | 3/2000 |
| EP | 1 103 187 A1 | 5/2001 |
| FR | 2484376 | 12/1981 |
| GB | 2 018 562 | 10/1979 |
| GB | 2 084 115 | 4/1982 |

(List continued on next page.)

Primary Examiner—Nina Bhat
(74) Attorney, Agent, or Firm—Winston & Strawn

(57) ABSTRACT

A festooned, edible laminated structures that have at least one first fluid material of a sticky or flowable mass is interleaved between thin layers of a second fluid material, wherein the first fluid material forms a pattern visible through the second fluid material, which has a visually translucent thickness. Methods of molding such products are also included.

21 Claims, No Drawings

FOREIGN PATENT DOCUMENTS

| | | |
|---|---|---|
| GB | 2 130 866 | 6/1984 |
| GB | 2 283 699 | 5/1995 |
| JP | 61047145 A | 3/1986 |
| JP | 61265048 | 11/1986 |
| JP | 61293336 | 12/1986 |
| JP | 62022555 | 1/1987 |
| JP | 62061544 | 3/1987 |
| JP | 62257347 | 11/1987 |
| JP | 63068039 | 3/1988 |
| JP | 63301749 | 12/1988 |
| JP | 1153044 | 6/1989 |
| JP | 1232963 | 9/1989 |
| JP | 8009887 | 1/1996 |
| JP | 8010313 | 1/1996 |
| JP | 11056278 | 3/1999 |
| JP | 11299422 | 11/1999 |
| JP | 2001314157 A | 11/2001 |
| SU | 459206 | 4/1975 |
| SU | 516390 | 6/1976 |
| SU | 591173 | 1/1978 |
| SU | 591174 | 1/1978 |
| SU | 1533630 | 1/1990 |
| WO | WO 94/02027 | 2/1994 |
| WO | WO 97/06691 | 2/1997 |
| WO | WO 9725874 | 7/1997 |
| WO | WO 00/60959 | 10/2000 |

FESTOONED LAMINATED CANDY AND METHODS FOR MAKING SAME

CROSS-REFERENCE TO RELATED APPLICATIONS

This application is a continuation-in-part of copending application Ser. No. 09/939,892, filed Aug. 27, 2001, and copending application Ser. No. 09/712,265 filed Nov. 15, 2000, the entire disclosure of each of which is hereby expressly incorporated herein by reference thereto.

TECHNICAL FIELD

The present invention relates to festooned, laminated edible products having a laminated structure with a desired visual pattern and texture, and methods of making such products having a sticky or flowable mass therein such as by extruding or depositing into a mold.

BACKGROUND ART

In view of the large amount of candy consumed by consumers, there is always an interest in providing new, different, and unusual candies. A popular type of candy is laminated candy products. These candy products consist of many layers of alternating materials. The texture of the candy product is a result of the laminated structure and the materials used to form the laminated structure. Typically, laminated candy products consist of layers of hard candy and a fatty paste or fluid such as peanut butter, which is then coated with chocolate or other coating. A candy product with a laminated structure of hard candy and a fatty paste or fluid generally has a crunchy texture.

The conventional process for producing a laminated product of hard candy and a fatty paste or fluid product involves heating candy syrup in a precooker to form a candy mass and boiling the resulting candy mass to produce a viscous material having a low moisture content. Typically, the moisture content is about 4–5%. The resulting boiled candy mass is discharged from the cooker and passed through an aeration screw to aerate the candy mass. The aerated candy mass is then placed on a steel tempering band which cools the candy mass to a specified temperature such that the candy mass remains pliable. The aerated candy mass is then sheeted and the candy sheet is coated with a layer of fatty paste. The layer of fatty paste and aerated candy may be sprinkled with rework prepared from reusable products from previous candy bar forming operations. Alternatively, the candy sheet can be sprinkled with rework before it is coated with the fatty paste or the candy sheet can be coated with a mixture of fatty paste and rework. The layer of candy mass and fatty paste is then rolled onto itself to give a thicker candy mass with more layers. The plastic mass is then sheeted and cut into individual bars. The whole system is continuous. The resulting candy bar centers can be coated with chocolate or other coatings to produce the final candy product. An example of this process is disclosed in U.S. Pat. Nos. 4,679,496, 4,778,685 and 4,858,524. Due to the rolling, it is only possible to prepare laminated candy products wherein one of the materials is a hard candy. If one of the materials is not a hard candy mass the two materials would simply flow together when they are rolled and a laminated structure would not be obtained.

U.S. Pat. No. 5,437,879 discloses a multi-layered chewing gum gel cream confection. The multi-layered chewing gum comprises at least two separate layers of a chewing gum composition and at least one layer of a hydrophilic confectionery gel cream sandwiched between the at least two separate layers of a chewing gum composition.

U.S. Pat. No. 4,911,937 discloses a chewable, peelable nougat candy comprising at least two layers of nougat wherein each layer of nougat is separable from the adjacent nougat layer by the interposition of a compound coating.

UK Patent Application No. 2 283 699 discloses a method of coextruding multi-layered food products. The food products may be jam, truffle, fondant, caramel, toffee, blancmange, marshmallow, aerated chocolate, batter, fat creams, pumpable pastes, and pumpable sauces. The food products are coextruded through different channels arranged side by side one after the other to define a column of channels.

U.S. Pat. No. 4,542,028 discloses a composite frozen confection comprising a multiplicity of superimposed extruded layers of extrudable confectionery material. Thin layers of a second confectionery material such as a fat based confection material are interleaved between layers of a frozen aerated confectionery such as ice cream.

U.S. Pat. No. 4,651,635 discloses an apparatus for making multi-layered folded pastries.

U.S. Pat. No. 5,500,234 discloses a crispy multi-layered cookie or sandwich like product wherein intermediate filler material may be used between the outer crispy or cookie layers without degradation of the crispiness of the outer layers.

Canadian Patent Application No. 2,187,940 discloses a multilayer dessert comprising at least one heat treated component of mousse, cream, jelly, and/or sauce that is coated with a continuous sterilized layer of fat coating or chocolate.

There is a need, however, for new laminated candy products that have unique texture, desirable visual appearance, and mouth feel, and provide a unique eating sensation. In particular, it is desired to provide festooned laminated candy products having a flowable or sticky mass therein, particularly one that has a reduced or eliminated tendency to stick to its packaging yet still has a visually appealing pattern.

SUMMARY OF THE INVENTION

The invention relates to a festooned-appearance laminated edible product. The product can include at least one first fluid material including a sticky or flowable mass that is arranged to have a festooned or swirled pattern; and at least one second fluid material which completely surrounds and encases the first fluid material and which has a visually translucent thickness but is visually discernable from the first fluid material so that the pattern of the first fluid material is visible through at least a portion of the second fluid material. Alternatively, the product can include a plurality of strips layered upon each other, wherein each strip includes at least one first fluid material comprising a sticky or flowable mass; and at least two layers of a second, different fluid material which completely surrounds and encases the first fluid material and which has a visually translucent thickness, wherein the first fluid material is interleaved between the at least two layers of the second fluid and forms a pattern visible through the second fluid material.

In one embodiment, neither the first fluid material nor the second fluid material is a hard candy mass. Preferably, the first fluid material has a moisture content of at least about 7 weight percent. In a preferred embodiment, each first fluid material includes at least one of jelly, nougat, fat cream, caramel, fudge, cookie dough, peanut butter, colored marshmallow, fondant, paste, liquid, or a combination thereof. In a more preferred embodiment, the first fluid material includes jelly.

The invention can include one or more inclusions in at least one of the first or second fluid materials. The inclusions can include cereals, grains, nuts, fruit pieces, jelly pieces, wafer, cookie, biscuit, candy, or combinations thereof, and have a size of less than about 0.1 inches. The same or different inclusions can be included in the different fluid materials.

In the embodiment with a plurality of strips, the strips preferably have a thickness of about 1/100 inch to 1/8 inch. In one preferred embodiment, the layer of superimposed strips has a thickness of about 0.01 to 4 inches. Preferably, about 2 to 500 strips are superimposed to form the product.

In one embodiment of the invention, the moisture content of the first fluid material is greater than about 8 weight percent. In a preferred embodiment of the invention, the visually translucent thickness is less than about 2 mm. In a preferred embodiment, the second fluid material includes a white, translucent fat-based material and the first fluid material includes a darker material visible through the second fluid material.

The invention also relates to a festooned-appearance laminated edible product including a plurality of strips layered upon each other, wherein each strip includes at least one first fluid material including a sticky or flowable mass having a Brix content of less than about 83 percent, and at least two layers of a second, different fluid material which completely surrounds and encases the first fluid material and which has a visually translucent thickness, wherein the first fluid material is interleaved between the at least two layers of the second fluid and forms a pattern visible through the second fluid material. Each of the above-noted embodiments applied to this aspect of the invention, as well.

In one embodiment, the Brix content is less than about 78 percent. Preferably, the invention will permit the product to avoid sticking to a wrapper under ambient conditions.

The invention further relates to methods for producing the festooned-appearance laminated edible product by providing a plurality of molds and depositing in each of the plurality of molds a first plurality of layers of at least one first fluid material interleaved between a second plurality of layers of a second fluid material in a visually translucent thickness to form the product, so that at least a portion of the first fluid material is visible through a portion of the second fluid material. In one embodiment, a portion of the second fluid material is deposited in each of the plurality of molds, the at least one first fluid material including a sticky or flowable mass is deposited adjacent the second fluid material in the plurality of molds to have a festooned or swirled pattern but without contacting the molds, and the remainder of the at least one second fluid material is deposited to completely surround and encase the first fluid material, wherein the at least one second fluid material has a visually translucent thickness but is visually discernable from the first fluid material so that the pattern of the first fluid material is visible through at least a portion of the second fluid material.

In one embodiment, a portion of the first and second plurality of layers is coated with an edible material to form the laminated edible product, either in the mold or after removal therefrom. In one embodiment, the edible material includes the second fluid material, and in one preferred embodiment the edible material is the same as each second fluid material.

In one embodiment, neither the first fluid material nor the second fluid material is a hard candy mass. In another embodiment, at least one of the first fluid material and the second fluid material has a moisture content of greater than about 7 percent by weight. In a preferred embodiment, the second fluid material includes a translucent fat-based confectionery material, sugar-based confectionery paste, or both. In a more preferred embodiment, the second fluid material includes white chocolate, a white compound coating, or both. In yet another embodiment where a plurality of layers are included, the first and second plurality of layers are deposited at an angle relative to each other. In another embodiment, the second fluid material solidifies at a temperature of about 30° C.

DETAILED DESCRIPTION OF THE PREFERRED EMBODIMENTS

The present invention relates to a product including at least one first fluid material including a sticky or flowable mass that is arranged to have a festooned or swirled pattern, and at least one second fluid material which completely surrounds and encases the first fluid material and which has a visually translucent thickness but is visually discernable from the first fluid material so that the pattern of the first fluid material is visible through at least a portion of the second fluid material. In one preferred embodiment, the festooned product includes a plurality of strips layered upon each other, wherein each strip includes at least one first fluid material interleaved between at least two layers of a second, different fluid material that can completely surround the first fluid material, and which has a visually translucent thickness, wherein the first fluid material is interleaved between the at least two layers of the second fluid and forms a pattern visible through the second fluid material. The second fluid material preferably flows at one temperature but solidifies at a lower temperature. Also, preferably neither the first fluid material nor the second fluid material is a hard candy mass. In one embodiment, at least some of the strips comprise a single first fluid material encased within a second fluid material. The first fluid material in the strip may have a variable thickness. The festooned, laminated edible product preferably includes many thin layers of alternating materials in one embodiment. The strips may be layered upon each other at an angle to form the edible product.

The present invention is also directed to a laminated edible product wherein a strip of at least one first fluid material encased in a layer of a second fluid material is layered on top of itself. The laminated edible product of this embodiment consists of may thin layers of alternating materials, wherein neither material is a hard candy mass.

One drawback to mass lamination is that the paste must set up fairly promptly after formation or it will flow out of the layers and produce a more messy appearing product or one that has less of the paste than desired. It has now been discovered that when the laminated product is molded it can advantageously include a first material, such as the paste, having significantly lower viscosity because the coating or second material contains the first material within the mold until the product is set properly.

By "strip" is meant one or more fluid materials that are simultaneously discharged from a coaxial die to form a product stream wherein one or more first fluid materials is encased between a second fluid material. Preferably, the one or more first fluid materials is completely surrounded by the second fluid material. The second fluid material completely surrounding the first fluid material(s) is accomplished by using a coaxial die with two or more concentric oval shaped exit ports, wherein the inner exit ports discharge the one or more first fluid material(s) and the outer exit port discharges the second fluid material. By having the second fluid material completely surround the first fluid material advantageously improves the integrity of the laminated structure by reducing the ability of the first fluid material to ooze or flow out of the laminated structure. Indeed, by having the second fluid material completely surround the first fluid material it is possible to make laminated structures with materials that previously could not be combined to form a laminated structure.

In the laminated edible product of the invention the first fluid material and the second fluid are either a fat based confectionery coating or a sugar based confectionery paste. Preferably, the first fluid material and the second fluid material are different. More preferably, the first and second fluid material are visually or texturally distinguishable, or both.

The second fluid material can be a fluid at one temperature and a solid at a lower temperature. In this embodiment, the second fluid material is a solid at temperatures of less than about 30° C. In the laminated edible products, the laminated structure is maintained in the final product preferably without having to refrigerate the final product. Furthermore, in one embodiment, it is typically unnecessary to form the laminated structure in a cup or other container or to keep the final laminated product in a cup or other container to maintain the laminated shape. Preferably, the layers of the laminated structure are not separable.

In one embodiment, when softer, flowable materials are used, it is typically necessary to form the laminated structure in a cup or other container or to keep the final laminated product in a cup or other container to maintain the laminated shape. If desired, such products can be molded directly into its packaging, such as a clear pudding cup, jelly cup, or other translucent or transparent outer packaging. When harder, less flowable materials are used, such as a chocolate outer layer, then no cup or container is required and the product should have suitable release properties to facilitate removal from the mold. Subsequently, a wrapper or other packaging can be applied, and this can be either opaque, transparent, or translucent.

By "fat based confectionery coating" is meant a chocolate or a compound coating.

The term "chocolate" as used herein means any confectionery product having qualities sufficient to impart chocolate taste and character. Suitable chocolates include, but are not limited to, sweet chocolate, milk chocolate, buttermilk chocolate, bittersweet chocolate and chocolates as defined in 21 C.F.R. §163. Chocolate also includes other materials, such as compound coatings, that have a chocolate flavor and perform as a chocolate analogue or a chocolate substitute.

The term "compound coating" as used herein means any confectionery product based on vegetable fat. In addition to vegetable fat the confectionery coatings typically contain sugar; flavorings such as cocoa solids, peanut solids, and other natural or artificial flavors; emulsifiers; coloring agents; and optionally milk solids. As noted above, some compound coatings closely resemble true chocolate, dark or milk. Other compound coatings, made from cocoa powder, non-fat milk powder, sugar, and one of the many vegetable fats, may have an appearance resembling dark or milk chocolate, but a texture that is quite different. Compound coatings also include pastel coatings, which have no cocoa powder and have added colors and flavors. The compound coating can have a variety of flavors including, but not limited to, maple, chocolate, vanilla, peanut butter, and butterscotch.

By "sugar based confectionery paste" is meant a sugar based candy that has a higher moisture content than a hard candy. Typically, the moisture content of a sugar based confectionery is more than about 7 percent, preferably more than about 10 percent. Sugar based confectionery pastes do not include cookies and cakes.

By "hard candy mass" is meant any hard candy product having a moisture content of about 3 to 5 percent by weight and which is produced by methods known to those of ordinary skill in the art.

Several examples of materials that can be combined to provide a laminated structure are provided below. In one embodiment the first (second) fluid material is a chocolate or compound coating and the second (first) fluid material is a jelly, nougat, fondant, nut paste, coconut paste, chocolate paste, fat cream or melt-away, caramel, fudge, flour based paste, cookie dough substitute, marshmallow, or a liquid. Preferably, the second fluid material is a chocolate or compound coating. For example, the first and second fluid materials can respectively include white chocolate or coating and jelly, such as raspberry or strawberry.

The term "jelly" as used herein means a sugar and starch based composition having a gummy texture. Typically jellies include pectin. A representative jelly recipe is to combine about 35.5 parts water, about 1.65 parts pectin, about 48.5 parts sugar, about 29.5 parts glucose syrup, about 0.75 parts 50% citric acid solution, and coloring and flavoring and then to boil the resulting mixture until a final solids content of about 75 percent is obtained.

The term "fondant" as used herein means a composition based on sugar, glucose syrup, and possibly invert sugar that has a creamy texture. A representative fondant recipe is to combine about 8 lbs sugar, about 2.2 lbs glucose syrup, and about 2.8 lbs water to provide a mixture and to then cook the mixture at about 240 to 250° C., preferably about 248° C. to a solids content of about 80 to 90 percent, preferably about 88 percent.

The term "nougat" as used herein is a composition, similar to a fondant in that it is based on sugar, but further comprises whipped eggs for a lighter texture, the mixture being whipped to a frappe. A representative nougat recipe is to dissolve about 0.25 lbs egg albumen in about 31 lbs water and add about 51 lbs icing sugar to provide a mixture and beat the mixture at high speed with a wire whisk to provide a whip. Separately, about 13 lbs sugar is dissolved in about 41 lbs of water followed by about 20 lbs of glucose syrup and the mixture boiled at about 260° C. to provide a syrup. The syrup is then added in thin streams to the whip with continuous whipping at low speed with a flat beater. Optionally, one or more of cocoa powder (about 2 lbs), malt powder (about 2 lbs), nonfat milk powder (about 1.5 lbs), or icing sugar (about 1.5 lbs) may be added and gradually stirred into the mixture of whip and syrup. Fat (about 11 lbs) is then melted at low temperature and added to the mixture with slow mixing for the minimum amount of time needed to disperse the fat. The resulting mixture can then be pumped while hot and cooled as part of the laminated mass.

The term "nut paste" as used herein means ground or chopped nuts that are made into a paste. Any type of nuts may be used including, but not limited to, almonds (marzipan), pecans, hazelnuts, walnuts, and peanuts.

The term "coconut paste" as used herein means a cream made of either toasted or fresh coconut.

The term "fat cream" or "melt-away" as used herein means a fat based cream. The term "cream" as used herein means a base for a fondant comprised of sugar, glucose, and invert sugar. Adding fat to the base provides a "fat cream" Typically, the fat content of the fat cream or melt-away is from about 15 to 35 percent, preferably from about 20 to 30 percent, and more preferably from about 24 to 27 percent. Optionally, colors and flavors may be added to the fat cream.

The term "caramel" as used herein means a caramelized sugar optionally containing milk and/or butter to provide a soft, medium, or hard texture. A representative caramel recipe is to combine about 6.5 lbs water, about 10 lbs white granulated sugar, about 10 lbs brown sugar, about 17 lbs glucose, about 18 lbs full fattened sweetened condensed milk, about 8 lbs hardened vegetable fat, about 8 oz glyceryl monostearate, and about 5 oz salt to provide a mixture and to then boil the mixture to the desired moisture content to provide a soft, medium, or hard caramel. A soft caramel is typically prepared by cooking at a temperature of about 245 to 248° F. to a water content of about 9 to 10 percent. A medium caramel is typically prepared by cooking at a temperature of about 250 to 255° F. to a water content of about 7 to 8 percent. A hard caramel is typically prepared by cooking at a temperature of about 262 to 267° F. to a water content of about 5 to 6 percent.

The term "fudge" as used herein means a caramel with the sugar being in the crystalline state and having a grainy and short texture. The recipe for a fudge is the same as the recipe for a caramel except that a fondant is added to the caramel to seed and initiate a crystallization process. Crystallization can also be initiated by agitation of the caramel while cooling. Crystallization involves the formation of sugar crystals during cooling, which can be regulated and controlled to obtain the desired size of crystals and is important in determining the textural characteristic of the final fudge product. The flavor and texture of the fudge are determined by the degree of boiling of the original caramel base and the amount of the fondant added to the grain the mass.

The term "liquid" as used herein can be any type of flowable liquid such as a cordial or fruit juice.

The term "flour based paste" as used herein means a paste, comprised of flour, sugar, oil, and water. Any type of flour can be used including, but not limited to, wheat, oat, rice, and soy flour. Any type of oil can be used including, but not limited to, coconut oil, peanut oil, vegetable oil, and coconut oil.

The term "cookie dough substitute" as used herein means a shelf stable, dairy free, egg free dough that resembles a regular cookie dough, but does not have to be refrigerated or baked. The term "shelf stable" as used herein means the product does not require any refrigeration and can be stored at room temperature with substantially no spoilage or microbiological growth.

Preferably, the first and second fluid materials do not include flour. When the first or second fluid material does contain flour, however, the product does not require cooking before being eaten and is shelf stable. Thus, the products of the invention are completely different from flour based confectionery products such as dough containing products that require cooking and are not shelf stable. Furthermore, the products of the invention are unlike dough containing products as they do not include flour in combination with eggs.

The term "marshmallow" as used herein is a sugar based, egg whipped, aerated confection well known to those of ordinary skill in the art.

Recipes for preparing a jelly, nougat, fondant, nut paste, coconut paste, chocolate paste, fat cream or melt-away, caramel, fudge, flour based paste, cookie dough substitute, marshmallow, or a liquid are well known to those of ordinary skill in the art and need not be further described herein (See, e.g., "Chocolate, Cocoa, and Confectionery Science and Technology," $3^{rd}$ ed., Bernard W. Minifie, Aspen Publishing (1999)).

The first or second fluid material may also include one or more flavorings or colorings. Any flavoring or coloring can be used. The flavoring or coloring can be natural or artificial. One or ordinary skill in the art would readily be able to select suitable colorings or flavorings without undue experimentation.

The first or second fluid material may optionally contain one or more inclusions. Any type of inclusion can be used including, but not limited to, cereals and grains, similar to breakfast cereal but smaller in size, including oats, puffed rice, and puffed wheat; nuts that are either whole, chopped, or ground; pieces of fruit; jelly pieces; pieces of wafers, cookies, or biscuits; candy pieces such as morsels of butterscotch, chocolate, hard candy, and gummies; or mixtures thereof. Typically, the pieces have dimensions that are less than about 0.1 inches (e.g., passes a #10 screen), preferably less than about 0.056 inches (e.g., passes a #18 screen). More preferably, any such inclusion pieces have dimensions that are from about 0.02 inches to 0.250 inches, preferably about 0.04 inches to 0.175 inches, more preferably from about 0.06 ($\frac{1}{16}$) inch to 0.125 ($\frac{1}{8}$) inch. The inclusions may be combined with the first or second fluid materials, or both, either before or after it is extruded or molded. In one embodiment, the strip may be extruded directly onto inclusions that are layered on a belt or the inclusions may be sprinkled on top of the strip after it is extruded. In another embodiment, the first and second fluid materials are deposited sequentially from separate nozzles into a mold. Alternatively, a coextrusion nozzle is used to codeposit the at least first and second fluid materials into a mold. The first fluid material or the second fluid material, or both, may also include one or more colorings or flavorings in any of these embodiments. Also, inclusions may be present in either fluid material, or both, in any of these embodiments.

The laminated structure may also be prepared by successively layering the strip on top of itself. The strip may be layered on top of itself, for example, by the method disclosed in U.S. patent application Ser. No. 6,183,799, the contents of which are expressly incorporated herein by reference hereto. Alternatively, the laminated structure can be prepared by aligning a plurality of coaxial dies parallel to each other and perpendicular to the movement of a conveyor belt and extruding the first and second fluid materials through each coaxial die onto the conveyor belt so that the extruded mass laminates on itself. In this embodiment of forming the laminated structure it is possible to form a laminated structure that is distorted and does not have a regular shape and provides a novel appearance. Preferably, the plurality of coaxial dies comprises from about 2 to 7 coaxial dies and more preferably from about 3 to 5 coaxial dies.

The thickness of the strips can be varied by varying the distance between the coaxial die assembly and the conveyor belt and potentially by oscillating the die. The thickness of the strips may be from about $\frac{1}{100}$ inch to $\frac{1}{8}$ inch. Preferably, the thickness of the strips is from about $\frac{1}{50}$ inch to $\frac{1}{10}$ inch. In one preferred embodiment, the thickness of the strips is about $\frac{1}{20}$ inch to $\frac{1}{10}$ inch. In addition, the thickness of the resulting stack (i.e., the number of layers of center-filled strips) can also be varied. The number of strips in the stack may vary from about 2 strips to 500 strips. Preferably the number of strips in the stack varies from about 10 strips to 300 strips, and in one preferred embodiment, from about 20 strips to 100 strips. As explained herein, each strip comprises three layers, i.e., at least one first fluid material encased in a layer of a second fluid material. The thickness of the stack may vary from about 1/100 inch to 4 inches. Preferably the thickness of the stack is from about 0.375 inches to 1 inch. The texture of the laminated structure is determined, in part, by the number of layers and the thickness of the layers.

When extruding a first fluid material encased in a second fluid material wherein neither of the fluid materials is a liquid or plastic candy mass the first and second fluid materials may be at the same temperature or a different temperatures. For example, if the first fluid material is a sugar based confectionery paste and the second fluid material is a compound coating, the first fluid material may be cooler than the second fluid material so that the first fluid material cools the second fluid material so that the second fluid material sets and assures the integrity of the laminated structure. The temperature difference between the first fluid material and the second fluid material is product specific and can vary over a wide range depending on the characteristics of the first fluid material and the second fluid material. The temperature difference can be in excess of 220° F. Typically, the temperature difference is less than about 50° F. For example, if a sugar based paste and a compound coating are laminated the sugar based paste is typically at a temperature of about 55° F. to 60° F. and the compound coating is at a temperature of about 95° F. to 100° F. A higher temperature for one of the fluid materials may be needed so that the material can be extruded. If the temperature difference is too large, however, the materials may mix or run together (this can happen for example when the first and second fluid materials are a chocolate and a nut paste) or there may be a decrease in viscosity that causes thinner layers to be formed. One of ordinary skill in the art will be able to readily determine the temperature of the first and second fluid materials without undue experimentation.

The second fluid material may solidify at a temperature of less than about 30° C. The first and second fluid materials may each be a fat based confectionery coating or a sugar based confectionery paste, or both. In one embodiment, the second fluid material is a fat based confectionery coating. The second fluid material may include chocolate, for example. The first fluid material may include jelly, nougat, fondant, nut paste, chocolate paste, fat cream, caramel, fudge, flour based paste, cookie dough, marshmallow, a liquid, or a combination thereof.

In one preferred embodiment, the first and second fluid materials, along with any other coloring agents, inclusions, or the like, are coextruded into a mold, preferably into a plurality of molds. This depositing can be either sequential or concurrent, but it is preferably concurrent in a plurality of molds. The molds can simplify processing, such as for low viscosity first fluid materials, by inhibiting or avoiding the flow of laminate materials away from the candy product. Thus, the molds can help the laminated candy product retain a suitable shape until the interleaved first and second fluid materials can be encapsulated or surrounded by the second fluid material or edible coating. This embodiment permits the first fluid material to have a low viscosity.

In one embodiment, the viscosity of the first fluid material is fairly low, as determined by Brix content (solids content) or moisture content. This low viscosity can be present in the first fluid material even after the product is sufficiently cooled and solidified to ambient conditions. The low viscosity can be measured in terms of moisture content, where the first fluid material can have a moisture content of about 5 to 12 weight percent moisture, preferably about 7 to 10 weight percent moisture. In one such preferred embodiment, the moisture content is from about 8 to 10 weight percent. For example, soft caramels have moisture contents that are typically greater than about 7 weight percent. Other particularly suitable soft materials having high moisture content and low viscosity include certain fondants, creams, ganaches, and even ice cream. In another embodiment the viscosity can be measured in terms of solids content, or Brix. Thus, the first fluid material can have a Brix content of about 60 to 88 percent, preferably about 60 to 83 percent. In one preferred embodiment, the Brix content of the first fluid material is about 70 to 82 percent, while in another preferred embodiment the Brix content is about 75 to 80 percent. An exemplary first fluid material would include a soft jelly having a Brix content of about 76 to 78 percent.

The mold inhibits or avoids flow and spillage problems that can arise when conducting the coextruding embodiment described herein. The resulting laminated candy product has the low viscosity first fluid material at least substantially completely contained within the second fluid material or the coating. The molded, laminated product can be of any suitable size.

One preferred laminated, edible product has a length of about 5 cm to 30 cm, preferably about 10 cm to 20 cm, and more preferably about 12 cm to 15 cm; a height of about 0.5 cm to 1.5 cm, and preferably about 0.75 cm to 1.25 cm; and a width that is about 1 cm to 6 cm, preferably about 2 cm to 4 cm, and more preferably 2.5 cm to 3.5 cm. An exemplary product dimension is one having a 13 cm length, a 3 cm base width tapered to a 2.5 cm top width, and a 1 cm height. Another preferred laminated edible product includes a snack cup, or a plurality of snack cups releasably attached to each other, e.g., in a six-pack. Alternatively, the laminated edible product can be in the form of other types of single serving food products. In one preferred embodiment, the laminated, edible product is packaged in a transparent container to facilitate the consumer view of the visual appeal present in laminated, edible products prepared according to the invention.

In this embodiment, the laminate preferably has 5 to 9 layers and can include softer, less viscous materials when using molding than with the basic co-extrusion embodiment. Molding can minimize or preferably avoid the need to cut candy pieces, since the molds can be shaped to a desired size. The mold embodiment tends to help the candy retain its freshness because the inner materials, i.e., the first and second fluid materials, are encapsulated within the laminated candy. The use of first fluid materials having a lower viscosity, e.g., a paste, typically will not flow out of the bar because the mold inhibits or prevents such flow problems that can occur when the co-extrusion bars are chopped.

According to the invention, the at least one first fluid material can be a mixture of two or more first fluid materials. In another embodiment the two or more first fluid materials are not extruded as a mixture but are extruded so that each of the first fluid materials are layered on top of the other first fluid material(s) to form a multi-layered strip of first fluid materials encased in the second fluid material. In yet another embodiment of the invention the at least one first fluid material is more than one fluid material that is extruded to form a single layer of first fluid materials encased in the second fluid material and wherein each first fluid material is adjacent to another first fluid material. Based on the disclosure herein, one of ordinary skill in the art will be able to readily modify the coaxial die assembly so as to produce multi-layered first fluid materials or to produce a single layer of first fluid materials wherein first fluid materials are adjacent to each other.

The novel laminated structures prepared by the process of the invention have a unique appearance. For example, each layer of the laminated structure may be a different color. For example, the laminated structure might comprise a mint fondant and a dark chocolate to provide a "zebra stripe" appearance. Moreover, since the laminated structures comprise materials that previously could not be laminated, the laminated structures have a unique texture and mouthfeel. The laminate of the present invention typically has first and second materials having different textures. For example, the second fluid material is relatively harder and the first fluid material is relatively softer.

The resulting laminated structure may be further enrobed or covered with a coating. The coating may be, for example, a chocolate, a fudge, and the like. In addition, the coating may be further covered with one or more toppings. Representative toppings include, but are not limited to sprinkles, crushed nuts, any of the inclusions listed above, or a combination thereof. The term "enrobing" as used herein means that the laminated structure is completely surrounded by the coating. For example, the laminated candy mass may be enrobed by dipping the laminated structure in a liquefied coating. The term "covered" as used herein means that the laminated structure is covered by the coating. For example, the laminated candy mass may be covered by pouring a liquefied coating over the laminated structure.

In one preferred embodiment of the invention, the laminated structure is festooned or swirled to provide a visually appealing product. This embodiment can be prepared in connection with any of the other embodiments described herein. The festooned or swirled appearance can be provided due to the color variations of the first and second fluids and their positioning in relation to each other relative to the surface of the product. Preferably, the second fluid material is visually discernable from the first fluid material so that the pattern of the first fluid material is visible through at least a portion of the second fluid material. Preferably, the festooned or patterned appearance arises from the combination of first and second fluid materials, such as by layering the materials during the formation of the product. In another embodiment, the first fluid material could itself be multicolored and the second fluid material can encapsulate the first fluid material.

The second fluid material must be translucent, which should generally be understood herein to also include transparent material, for this embodiment to permit viewing of the encased first fluid material(s) therein. In one embodiment, however, the second fluid material includes translucent but not transparent materials, while in another embodiment it can include transparent but not translucent materials. In particular, a translucent second fluid material can be provided in a visually translucent thickness so that the festooned or swirled pattern of the first fluid material can be readily viewed. Preferably, the second fluid material encasing the first fluid material has a thickness of less than about 2 mm, more preferably from about 0.1 mm to 1.5 mm, and most preferably from about 0.2 mm to 1 mm.

The festooned or swirled embodiment can be prepared as noted herein, preferably by depositing two fluid materials through a co-axial diehead into a mold. The first fluid material is typically a sticky or flowable mass and the second fluid material is preferably fat-based. During depositing, the second fluid material must encapsulate the first fluid material to inhibit or preferably prevent the first fluid material from contacting the interior of the mold during the depositing. Alternatively, a shell may be formed in the mold, before the first and second fluid materials are disposed therein, which is sufficient either alone or in combination with the second fluid material to prevent the first fluid material from contacting the mold walls. When this alternative is used, the second fluid material need not encapsulate the first fluid material if the shell does so.

To provide a festooned or swirled appearance in the product, the second fluid material is at least translucent. The second fluid material can include cocoa butter, chocolate coating, or compound coating, or a combination thereof. The use of milk or dark chocolate coatings or second fluid materials should be minimized, since the darker color can more easily inhibit the viewing of the festooned appearance. Preferably, the second fluid material is white or a neutral color that will not significantly block the view through to the pattern, e.g., it can be beige, yellow, or the like. An exemplary second fluid material is white, such as white chocolate or white compound coating. Any of the various types of inclusions or first fluid materials described herein can be used to provide the festooned or swirled appearance product. Exemplary first fluid materials for this embodiment include jellies, caramel, peanut butter, fondant (e.g., peppermint or cream), or any pumpable confection that is a different and preferably darker color than the second fluid material. Other exemplary first fluid materials include marshmallow or chocolates, or both, that are relatively darker than the second fluid material to provide a visual contrast.

Typically, the first and second fluid materials have a sufficient contrast in colors to provide the festooned or swirled appearance. Preferably, the first fluid material is a color that is darker than the second fluid material so that the pattern is visible through the second material. For example, a red jelly or a chocolate paste can be included in the first fluid material and a white compound coating can be included in the second fluid material to provide a suitable contrast in color.

The festooned laminated edible product of first and second fluid materials optionally and preferably has a coating, preferably formed of more of the second fluid material. During formation of the product, the mold can be filled using an extrusion die (e.g., coaxially deposited), pumping the materials in simultaneously, or the like, as noted herein. Preferably, to avoid undesired sticking of the first fluid material to the mold, the coating or a layer of second fluid material is applied to the mold first before any first fluid material is introduced into the mold. In one embodiment, the product can be prepared, e.g., by depositing a portion of the second fluid material in each of a plurality of molds, then depositing at least one first fluid material including a sticky or flowable mass adjacent the second fluid material in the plurality of molds to have a festooned or swirled pattern so that the first fluid material does not contact the mold surfaces. The remainder of the at least one second fluid material is deposited so that the second fluid material as a whole completely surrounds and encases the first fluid material. Once cooled, e.g., below about 30° C., the molded tablet or product can be released from the mold and will at least substantially retain its shape thereafter.

Another aspect of the invention is a festooned, laminated edible product having at least one first fluid material including a sticky or flowable mass that is arranged to have a festooned or swirled pattern, and at least one second fluid material which completely surrounds and encases the first fluid material and which has a visually translucent thickness but is visually discernable from the first fluid material so that the pattern of the first fluid material is visible through at least a portion of the second fluid material.

The term "about" as used herein should generally be understood to refer to both numbers in a range of numerals. Moreover, all numerical ranges herein should be understood to include each whole integer within the range.

EXAMPLES

The invention is further defined by reference to the following examples describing in detail the products of the present invention. The examples are representative, and should not be construed to limit the scope of the invention in any way.

Example 1

Laminated Chocolate and Caramel Candy Bar

A mass lamination line of chocolate and caramel candy can be prepared by coextruding any chocolate, including white chocolate, onto a conveyor belt at a temperature of about 86° F. and a caramel at a temperature of about 90° F. The resulting laminated structure is run through bar slitters to make centers and the resulting centers can be enrobed in chocolate to make a final bar.

As an alternative, this product can be prepared by coaxially depositing a white chocolate and caramel into a mold to form a product having a swirled, interleaved portion inside that is surrounded by a visually translucent chocolate.

Example 2

Laminated White Chocolate and Strawberry Jelly Bar

A festooned, laminated white chocolate and jelly bar can be prepared by coextruding a white chocolate at about 86° F. and a jelly at a temperature of about 90° F. into a mold to form a final product having a thin layer of translucent white chocolate and a swirled, interleaved portion therein that is visible from the outside.

Although preferred embodiments of the invention have been described in the foregoing Detailed Description, it will be understood that the invention is not limited to the embodiments disclosed, but is capable of numerous rearrangements and modifications of parts and elements without departing from the spirit of the invention. It will be understood that the chemical and/or mechanical details of every design may be slightly different or modified by one of ordinary skill in the art without departing from the teachings of the present invention.

What is claimed is:

1. A festooned-appearance laminated edible product comprising:
a plurality of strips layered upon each other, wherein each strip comprises:
at least one first fluid material comprising a sticky or flowable mass; and
at least two layers of a second, different fluid material which completely surrounds and encases the first fluid material and which has a visually translucent thickness,
wherein the first fluid material is interleaved between the at least two layers of the second fluid and forms a pattern visible through the second fluid material.

2. The product of claim 1, wherein neither the first fluid material nor the second fluid material is a hard candy mass, and wherein the first fluid material has a moisture content of at least about 7 weight percent.

3. The product of claim 1, wherein each first fluid material comprises at least one of jelly, nougat, fat cream, caramel, fudge, cookie dough, peanut butter, colored marshmallow, fondant, paste, liquid, or a combination thereof.

4. The product of claim 3, wherein the first fluid material comprises jelly.

5. The product of claim 1, wherein at least one of the first or second fluid materials comprises one or more inclusions.

6. The product of claim 5, wherein the inclusions comprise cereals, grains, nuts, fruit pieces, jelly pieces, wafer, cookie, biscuit, candy, or combinations thereof and have a size of less than about 0.1 inches.

7. The product of claim 1, wherein the strips have a thickness of about 1/100 inch to 1/8 inch.

8. The product of claim 7, wherein about 2 to 500 strips are superimposed to form the product, the moisture content is greater than about 8 weight percent, and the layer of superimposed strips has a thickness of about 0.01 to 4 inches.

9. The product of claim 1, wherein the visually translucent thickness is less than about 2 mm.

10. The product of claim 1, wherein the second fluid material comprises a white, translucent fat-based material and the first fluid material comprises a darker material visible through the second fluid material.

11. A festooned-appearance laminated edible product comprising:
a plurality of strips layered upon each other, wherein each strip comprises:
at least one first fluid material comprising a sticky or flowable mass having a Brix content of less than about 83 percent; and
at least two layers of a second, different fluid material which completely surrounds and encases the first fluid material and which has a visually translucent thickness,
wherein the first fluid material is interleaved between the at least two layers of the second fluid and forms a pattern visible through the second fluid material.

12. The product of claim 10, wherein the Brix content is less than about 78 percent and wherein the product will not stick to a wrapper under ambient conditions.

13. A method of producing a the festooned-appearance laminated edible product which comprises:
providing a plurality of molds; and
depositing in each of the plurality of molds a first plurality of layers of at least one first fluid material interleaved between a second plurality of layers of a second fluid material in a visually translucent thickness to form the product, so that at least a portion of the first fluid material is visible through a portion of the second fluid material,
wherein the first fluid material comprises a sticky or fluid mass and the second fluid material conipletely surrounds and encases the first fluid material.

14. The method of claim 13, which further comprises coating a portion of the first and second plurality of layers in each mold with an edible material to form the laminated edible product.

15. The method of claim 14, wherein the edible material comprises the second fluid material.

16. The method of claim 13, wherein neither the first fluid material nor the second fluid material is a hard candy mass.

17. The method of claim 13, wherein at least one of the first fluid material and the second fluid material has a moisture content of greater than about 7 percent by weight.

18. The method of claim 13, wherein the second fluid material comprises a translucent fat-based confectionery material, sugar-based confectionery paste, or both.

19. The method of claim 13, wherein the second fluid material comprises white chocolate, a white compound coating, or both, and wherein the first and second plurality of layers are deposited at an angle relative to each other.

20. The method of claim 13, wherein the second fluid material solidifies at a temperature of about 30° C.

21. A festooned-appearance laminated edible product comprising:

at least one first fluid material comprising a sticky or flowable mass that is arranged to have a festooned or swirled pattern; and at least one second fluid material which completely surrounds and encases the first fluid material and which has a visually translucent thickness but is visually discernable from the first fluid material so that the pattern of the first fluid material is visible through at least a portion of the second fluid material.

* * * * *

UNITED STATES PATENT AND TRADEMARK OFFICE
CERTIFICATE OF CORRECTION

PATENT NO.    : 6,592,928 B2						Page 1 of 1
DATED         : July 15, 2003
INVENTOR(S)   : Makela et al.

It is certified that error appears in the above-identified patent and that said Letters Patent is hereby corrected as shown below:

<u>Column 14,</u>
Line 48, after "A method of producing a", delete "the"; and
Line 60, delete "conipletelv" and insert -- completely --.

<u>Column 16,</u>
Line 9, delete "discemable" and insert -- discernable --.

Signed and Sealed this

Ninth Day of September, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,592,928 B2
DATED         : July 15, 2003
INVENTOR(S)   : Makela et al.

It is certified that error appears in the above-identified patent and that said Letters Patent is hereby corrected as shown below:

Title page,
Item [*] Notice, should read -- Subject to any disclaimer, the term of this patent is extended or adjusted under 35 U.S.C. 154 (b) by 30 days --

Signed and Sealed this

Tenth Day of August, 2004

JON W. DUDAS
*Acting Director of the United States Patent and Trademark Office*